US009638171B2

United States Patent
Huang et al.

(10) Patent No.: US 9,638,171 B2
(45) Date of Patent: May 2, 2017

(54) SYSTEM AND METHODS FOR CONTROLLING WIND TURBINE

(75) Inventors: Xiongzhe Huang, Shanghai (CN); Danian Zheng, Simpsonville, SC (US); Wei Xiong, Sichuan (CN)

(73) Assignee: General Electric Company, Schenectady, NY (US)

( * ) Notice: Subject to any disclaimer, the term of this patent is extended or adjusted under 35 U.S.C. 154(b) by 870 days.

(21) Appl. No.: 13/980,476

(22) PCT Filed: Jan. 31, 2011

(86) PCT No.: PCT/CN2011/000173
§ 371 (c)(1),
(2), (4) Date: Jul. 18, 2013

(87) PCT Pub. No.: WO2012/103668
PCT Pub. Date: Aug. 9, 2012

(65) Prior Publication Data
US 2013/0297085 A1    Nov. 7, 2013

(51) Int. Cl.
*G05B 15/02* (2006.01)
*F03D 7/02* (2006.01)

(52) U.S. Cl.
CPC ........ *F03D 7/0276* (2013.01); *F05B 2270/32* (2013.01); *F05B 2270/322* (2013.01);
(Continued)

(58) Field of Classification Search
None
See application file for complete search history.

(56) References Cited

U.S. PATENT DOCUMENTS 4,695,736 A * 9/1987 Doman ................. F03D 7/0272
290/44
6,320,272 B1   11/2001 Lading et al.
(Continued)

FOREIGN PATENT DOCUMENTS

CN    1940289 A      4/2007
WO    2009109467 A2   9/2009

OTHER PUBLICATIONS

International Search Report, PCT/CN2011/000173, dated Nov. 3, 2011, pp. 11.

*Primary Examiner* — Sean Shechtman
(74) *Attorney, Agent, or Firm* — James McGinness, Esq.; Armstrong Teasdale LLP (57) ABSTRACT

A method of operating a wind turbine is provided. The wind turbine includes a rotor that is rotatably coupled to a generator that is positioned within a nacelle. The rotor includes one or more rotor blades that are coupled to a hub. The method includes transmitting, from a first sensor to a control system, at least a first monitoring signal indicative of a first wind condition at a first distance from the wind turbine. A second sensor transmits at least a second monitoring signal that is indicative of a second wind condition at a second distance from the wind turbine that is longer than the first distance to the control system. The control system calculates a wind turbine operating command based at least in part on the first monitoring signal and the second monitoring signal. One or more wind turbine components are operated based on the calculated wind turbine operating command.

18 Claims, 5 Drawing Sheets

(52) U.S. Cl.
CPC . *F05B 2270/404* (2013.01); *F05B 2270/8042* (2013.01); *Y02E 10/723* (2013.01)

(56) References Cited

U.S. PATENT DOCUMENTS

| | | |
|---|---|---|
| 6,946,751 B2 | 9/2005 | Yoshida |
| 7,281,891 B2 | 10/2007 | Smith et al. |
| 7,342,323 B2 | 3/2008 | Avagliano et al. |
| 2004/0067134 A1 | 4/2004 | Beauchamp et al. |
| 2006/0140764 A1 | 6/2006 | Smith et al. |
| 2007/0171396 A1 | 7/2007 | Harris et al. |
| 2008/0078228 A1 | 4/2008 | Nies |
| 2009/0047116 A1 | 2/2009 | Barbu et al. |
| 2010/0054939 A1 | 3/2010 | Hoffmann |
| 2010/0111693 A1 | 5/2010 | Wilson |
| 2011/0295438 A1* | 12/2011 | Rogers .............. F03D 7/0204 700/287 |
| 2012/0051907 A1* | 3/2012 | Rogers .............. F03D 7/0224 416/1 |
| 2014/0035285 A1* | 2/2014 | Creaby .............. F03D 7/0208 290/44 |

* cited by examiner

SYSTEM AND METHODS FOR CONTROLLING WIND TURBINE

CROSS REFERENCE TO RELATED APPLICATIONS

This application claims benefit of PCT Patent Application No. PCT/CN2011/000173 filed Jan. 31, 2011, which is hereby incorporated by reference in its entirety.

BACKGROUND OF THE INVENTION

The embodiments described herein relate generally to wind turbines and, more particularly to a system and method for controlling a wind turbine.

At least some known wind turbines include a nacelle fixed on a tower. The nacelle includes a rotor assembly coupled to a generator through a shaft. In known rotor assemblies, a plurality of rotor blades extend from a rotor. The rotor blades are oriented such that wind passing over the rotor blades turns the rotor and rotates the shaft, thereby driving the generator to generate electricity.

During operation of known wind turbines, power output generally increases with wind speed until a rated power output is reached. At least some known wind turbines adjust a pitch of the rotor blades in response to an increase in wind speed to maintain a constant power output. At least some known wind turbines includes a feedback control system to monitor the wind turbine power output and to change a pitch of a rotor blade pitch to adjust the power output to a predefined power output level.

In case of sudden turbulent gusts, wind speed, wind turbulence, and wind shear may change drastically in a relatively small interval of time and may cause rotor imbalance. At least some known wind turbines have a time lag between the occurrence of a turbulent gust and the pitching of the rotor blades based on the operation of the feedback control system. As a result, load imbalances and generator speed may increase significantly during such turbulent gusts, and may exceed the maximum predefined power output level that cause the generator to trip and the wind turbine to shut down. In addition, the rotor blades may be subjected to stresses that cause fatigue cracking and/or failure, which may eventually cause suboptimal performance of the wind turbine.

BRIEF DESCRIPTION OF THE INVENTION

In one aspect, a method of operating a wind turbine is provided. The wind turbine includes a rotor that is rotatably coupled to a generator that is positioned within a nacelle. The rotor includes one or more rotor blades that are coupled to a hub. The method includes transmitting, from a first sensor to a control system, at least a first monitoring signal indicative of a first wind condition at a first distance from the wind turbine. A second sensor transmits at least a second monitoring signal that is indicative of a second wind condition at a second distance from the wind turbine that is longer than the first distance to the control system. The control system calculates a wind turbine operating command based at least in part on the first monitoring signal and the second monitoring signal. One or more wind turbine components are operated based on the calculated wind turbine operating command.

In another aspect, a wind turbine control system for use with a wind turbine is provided. The wind turbine includes a rotor that is rotatably coupled to a generator that is positioned within a nacelle. The rotor includes one or more rotor blades that are coupled to a hub. The wind turbine control system includes a first sensor that is configured to sense a first wind condition at a first distance from the wind turbine. A second sensor is configured to sense a second wind condition at a second distance from the wind turbine that is longer than the first distance. A controller is coupled to the first sensor and the second sensor. The controller is configured to calculate a wind turbine operating command based at least in part on the sensed first wind condition and the sensed second wind condition.

In yet another aspect, a wind turbine is provided. The wind turbine includes a tower, a nacelle that is coupled to the tower, a generator that is positioned within the nacelle, a rotor that is coupled to the generator with a rotor shaft, at least one rotor blade that is coupled to the rotor, and a wind turbine control system. The wind turbine control system includes a first sensor that is configured to sense a first wind condition at a first distance from the wind turbine. A second sensor is configured to sense a second wind condition at a second distance from the wind turbine that is longer than the first distance. A controller is coupled to the first sensor and to the second sensor. The controller is configured to calculate a wind turbine operating command based at least in part on the sensed first wind condition and the sensed second wind condition.

DETAILED DESCRIPTION OF THE INVENTION

The exemplary methods and systems described herein overcome disadvantages of known wind turbines by providing a control system that operates the wind turbine based on a sensed wind condition upwind of the wind turbine. Moreover, the wind turbine includes a LIDAR sensor for sensing a wind condition at two locations upwind of the wind turbine. By determining the wind condition upwind of the wind turbine, the control system facilitates preventing overspeed of the wind turbine caused by sudden gusts of wind that may cause damage to wind turbine components. By preventing an overspeed of the wind turbine, the cost of operating the wind turbine system is facilitated to be reduced. As used herein, the term "overspeed" refers to a rotational speed of a rotor shaft at which potential damage to the rotor shaft including damage to the turbine may occur.

Figure 1:
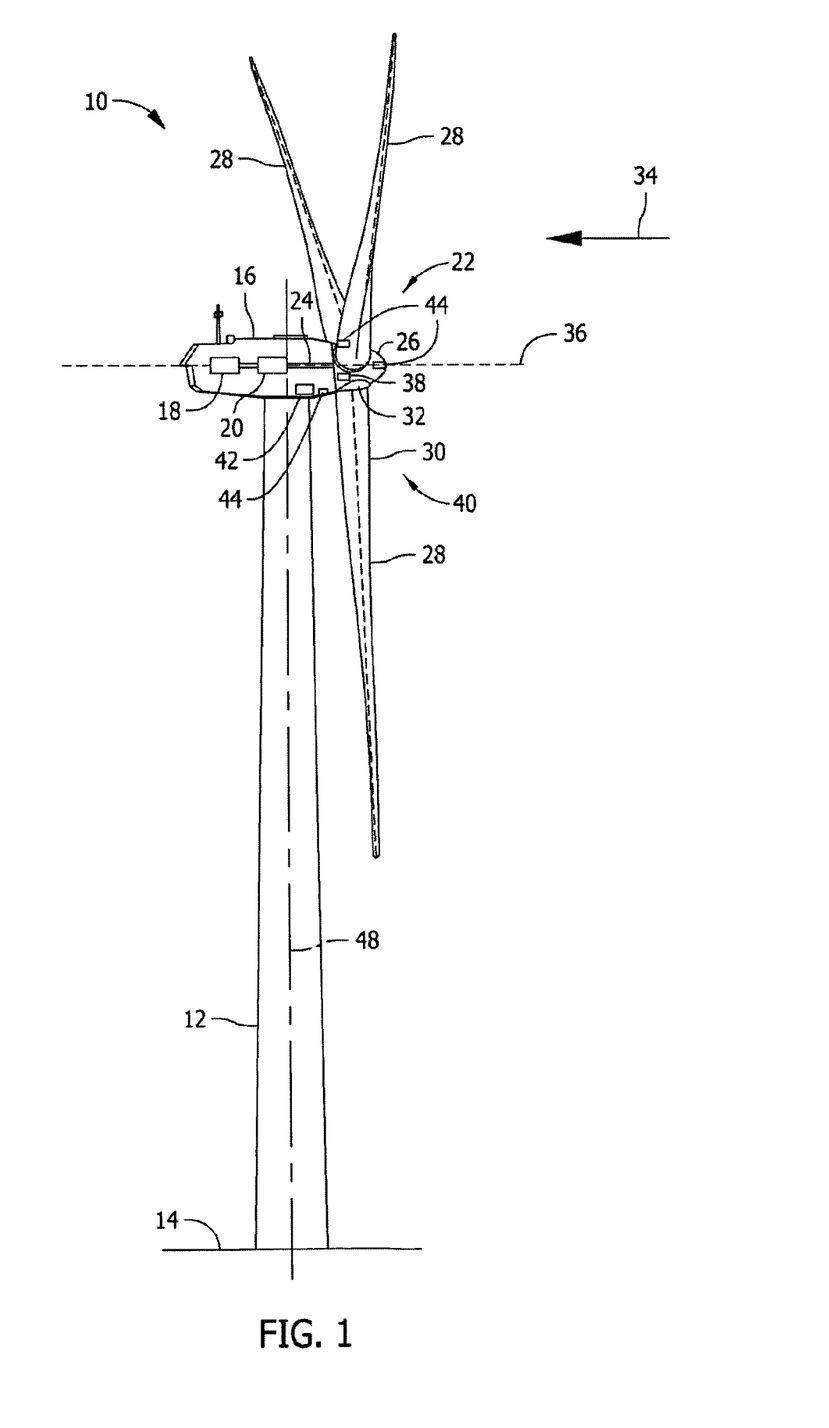
FIG. 1 is a perspective view of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support surface 14, a nacelle 16 that is mounted on tower 12, a generator 18 that is positioned within nacelle 16, a gearbox 20 that is coupled to generator 18, and a rotor 22 that is rotatably coupled to gearbox 20 with a rotor shaft 24. Rotor 22 includes a rotatable hub 26 and at least one rotor blade 28 that is coupled to and extends outwardly from hub 26. Alternatively, wind turbine 10 does not include gearbox 20, such that rotor 22 is coupled to generator 18 via rotor shaft 24.

In the exemplary embodiment, rotor 22 includes three rotor blades 28. In an alternative embodiment, rotor 22 includes more or less than three rotor blades 28. Rotor blades 28 are spaced about hub 26 to facilitate rotating rotor 22 to enable kinetic energy to be transferred from the wind into usable mechanical energy, and subsequently, electrical energy. Rotor blades 28 are mated to hub 26 by coupling a blade root portion 30 to hub 26 at a plurality of load transfer regions 32. Loads induced to rotor blades 28 are transferred to hub 26 via load transfer regions 32. In the exemplary embodiment, each rotor blade 28 has a length ranging from about 30 meters (m) (99 feet (ft)) to about 120 m (394 ft). Alternatively, rotor blades 28 may have any suitable length that enables wind turbine 10 to function as described herein. For example, other non-limiting examples of rotor blade lengths include 10 m or less, 20 m, 37 m, or a length that is greater than 120 m. As wind strikes rotor blades 28 from a direction 34, rotor 22 is rotated about an axis of rotation 36. As rotor blades 28 are rotated and subjected to centrifugal forces, rotor blades 28 are also subjected to various forces and moments. As such, rotor blades 28 may oscillate, deflect and/or rotate from a neutral position, i.e. a non-deflected position to a deflected position. A pitch adjustment system 38 is coupled to one or more rotor blades 28 for adjusting a pitch angle or blade pitch of each rotor blade 28, i.e., an angle that determines a perspective of rotor blade 28 with respect to direction 34 of the wind. Pitch adjustment system 38 is configured to adjust a pitch of rotor blade 28 to control the oscillation, load, and/or power generated by wind turbine 10.

In the exemplary embodiment, wind turbine 10 includes a control system 40. Control system 40 includes a controller 42 that is coupled in communication with one or more wind condition sensors 44. Each wind condition sensor 44 is configured to sense one or more wind conditions at a location upwind of wind turbine 10, and to transmit a signal indicative of the sensed wind condition to controller 42. As used herein, the term "upwind" refers to a distance from wind turbine 10 oriented in direction 34 of the wind. Wind condition sensors 44 are configured to sense wind conditions such as, for example a wind speed, a wind direction, a wind turbulence intensity, and/or a storm wind gust. In the exemplary embodiment, control system 40 is coupled in operative communication to pitch adjustment system 38 to control a pitch of rotor blades 28. Control system 40 is configured to adjust a pitch of rotor blades 28 based, at least in part, on the sensed wind condition upwind of wind turbine 10. In the exemplary embodiment, control system 40 is positioned within nacelle 16. Alternatively, control system 40 may be a distributed system throughout wind turbine 10, on support surface 14, within a wind farm, and/or at a remote control center.

Figure 2:
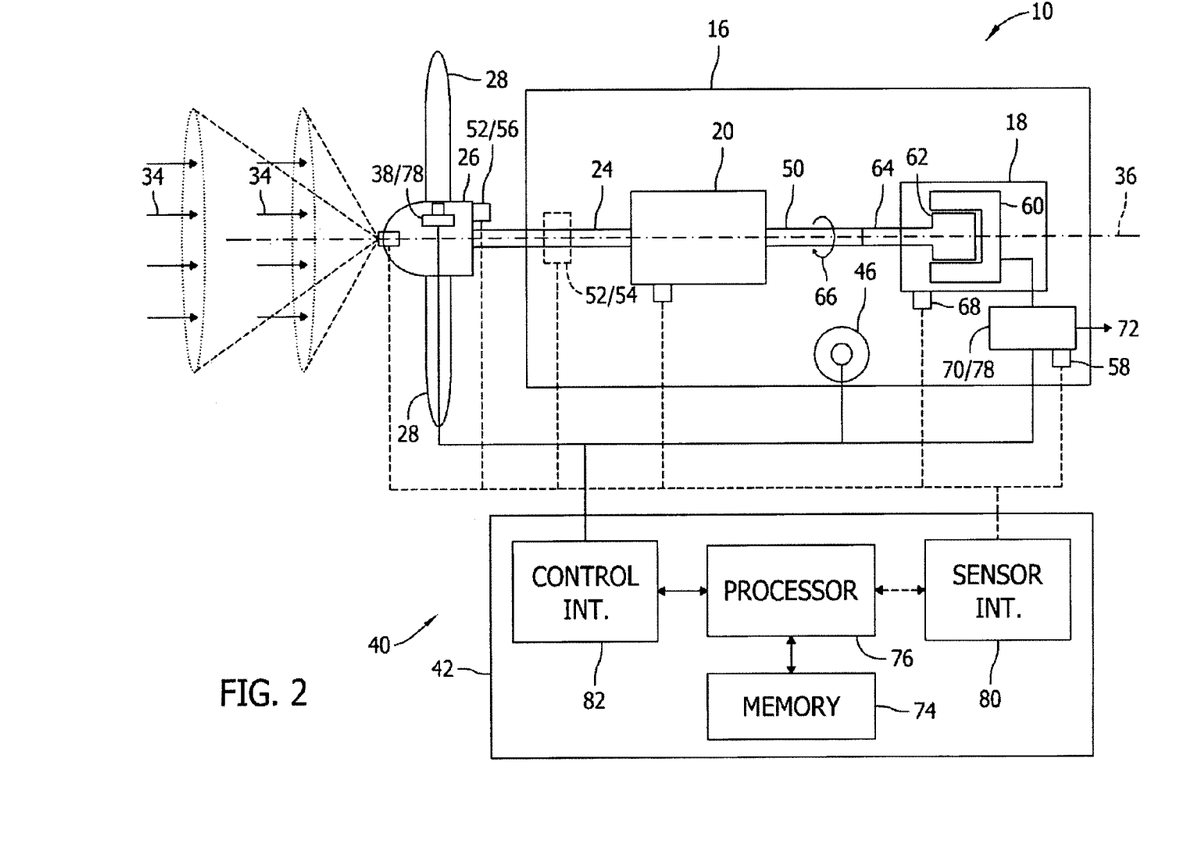
FIG. 2 is a schematic view of the wind turbine shown in FIG. 1 including an exemplary wind turbine control system.

FIG. 2 is a schematic view of wind turbine 10. Identical components shown in FIG. 2 are labeled with the same reference numbers used in FIG. 1. In the exemplary embodiment, nacelle 16 includes rotor shaft 24, gearbox 20, generator 18, and a yaw drive mechanism 46. Yaw drive mechanism 46 facilitates rotating nacelle 16 and hub 26 on yaw axis 48 (shown in FIG. 1) to control the perspective of rotor blade 28 with respect to direction 34 of the wind. Rotor shaft 24 extends between rotor 22 and gearbox 20. Hub 26 is coupled to rotor shaft 24 such that a rotation of hub 26 about axis 36 facilitates rotating rotor shaft 24 about axis 36. A high speed shaft 50 is coupled between gearbox 20 and generator 18 such that a rotation of rotor shaft 24 rotatably drives gearbox 20 that subsequently drives high speed shaft 50. High speed shaft 50 rotatably drives generator 18 to facilitate production of electrical power by generator 18.

In the exemplary embodiment, control system 40 includes a plurality of sensors 52 for detecting various conditions of wind turbine 10. Sensors 52 may include, but are not limited to only including, vibration sensors, acceleration sensors, rotational speed sensors, displacement sensors, power output sensors, torque sensors, position sensors, and/or any other sensors that sense various parameters relative to the operation of wind turbine 10. As used herein, the term "parameters" refers to physical properties whose values can be used to define the operating conditions of wind turbine 10, such as a temperature, a generator torque, a power output, a component load, a shaft rotational speed, and/or a component vibration at defined locations. In the exemplary embodiment, at least one acceleration sensor 54 is coupled to rotor shaft 24 for sensing a rotational speed of rotor shaft 24 and transmitting a signal indicative of the sensed rotational speed to controller 42. At least one vibration sensor 56 is coupled to one or more wind turbine components such as, for example, rotor blade 28, hub 26, rotor shaft 24, gearbox 20, and/or generator 18 for sensing a structural loading imparted to the wind turbine components during operation of wind turbine 10 and transmitting a signal indicative of the sensed loading to controller 42.

Generator 18 may be any suitable type of electrical generator, such as, but not limited to, a wound rotor induction generator, a double-fed induction generator (DFIG, also known as dual-fed asynchronous generators), a permanent magnet (PM) synchronous generator, an electrically-excited synchronous generator, and a switched reluctance generator. At least one power sensor 58 is coupled to generator 18 for sensing a power output of generator 18 and transmitting a signal indicative of the sensed power output to controller 42.

In the exemplary embodiment, generator 18 includes a stator 60 and a generator rotor 62 positioned adjacent stator 60 to define an air gap therebetween. Generator rotor 62 includes a generator shaft 64 that is coupled to high speed shaft 50 such that rotation of rotor shaft 24 drives rotation of generator rotor 62. A torque of rotor shaft 24, represented by arrow 66, drives generator rotor 62 to facilitate generating variable frequency AC electrical power from a rotation of rotor shaft 24. Generator 18 imparts an air gap torque between generator rotor 62 and stator 60 that opposes torque 66 of rotor shaft 24. At least one torque sensor 68 is coupled to generator 18 for sensing an air gap torque between generator rotor 62 and stator 60 and transmitting a signal indicative of the sensed air gap torque to controller 42. A power converter assembly 70 is coupled to generator 18 for converting the variable frequency AC to a fixed frequency AC for delivery to an electrical load 72, such as, for example a power grid that is coupled to generator 18. Power converter assembly 70 is configured to adjust the air gap torque between generator rotor 62 and stator 60 by adjusting a power current and/or power frequency distributed to stator 60 and generator rotor 62. Power converter assembly 70 may include a single frequency converter or a plurality of frequency converters that are configured to convert electricity generated by generator 18 to electricity suitable for delivery over the power grid.

In the exemplary embodiment, control system 40 is coupled to power converter assembly 70 to adjust an air gap torque between generator rotor 62 and stator 60. By adjusting the air gap torque, control system 40 adjusts a rotational speed of rotor shaft 24 and adjusts a magnitude of loads imparted to various components of wind turbine 10, such as, for example rotor shaft 24, rotor blade 28, gearbox 20, and/or hub 26. In the exemplary embodiment, control system 40 transmits one or more torque commands and/or one or more power commands to power converter assembly 70. Power converter assembly 70 generates a rotor current based on the torque commands and/or the power commands received from control system 40.

In the exemplary embodiment, controller 42 is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, controller 42 may be a microprocessor that includes read-only memory (ROM) and/or random access memory (RAM), such as, for example, a 32 bit microcomputer with 2 Mbit ROM and 64 Kbit RAM. Alternatively, controller 42 may be a connected network of micro-computer processing units (micro-CPU's) over a distributed network. As used herein, the term "real-time" refers to outcomes occurring at a substantially short period of time after a change in the inputs affect the outcome, with the time period being a design parameter that may be selected based on the importance of the outcome and/or the capability of the system processing the inputs to generate the outcome.

In the exemplary embodiment, controller 42 includes a memory area 74 that is configured to store executable instructions and/or one or more operating parameters representing and/or indicating an operating condition of wind turbine 10. Operating parameters may represent and/or indicate, without limitation, a wind speed, a wind temperature, a torque loading, a power output, and/or a wind direction. Controller 42 also includes a processor 76 that is coupled to memory area 74 and is programmed to determine an operation of one or more wind turbine control devices 78, for example, pitch adjustment system 38 and power converter assembly 70, based, at least in part, on one or more operating parameters. In one embodiment, processor 76 may include a processing unit, such as, without limitation, an integrated circuit (IC), an application specific integrated circuit (ASIC), a microcomputer, a programmable logic controller (PLC), and/or any other programmable circuit. Alternatively, processor 76 may include multiple processing units (e.g., in a multi-core configuration).

In the exemplary embodiment, controller 42 includes a sensor interface 80 that is coupled in signal communication with at least one sensor 52 such as, for example, wind condition sensor 44, acceleration sensor 54, vibration sensor 56, power sensor 58, and torque sensor 68. Each sensor 52 generates and transmits a signal corresponding to an operating parameter of wind turbine 10. Moreover, each sensor 52 may transmit a signal continuously, periodically, or only once, for example, though other signal timings are also contemplated. Furthermore, each sensor may transmit a signal either in an analog form or in a digital form. Controller 42 processes the signal(s) by processor 76 to create one or more operating parameters. In some embodiments, processor 76 is programmed (e.g., with executable instructions in memory area 74) to sample a signal produced by sensor 52. For example, processor 76 may receive a continuous signal from sensor 52 and, in response, calculate an operating parameter of wind turbine 10 based on the continuous signal periodically (e.g., once every five seconds). In some embodiments, processor 76 normalizes a signal received from sensor 52. For example, sensor 52 may produce an analog signal with a parameter (e.g., voltage) that is directly proportional to an operating parameter value. Processor 76 may be programmed to convert the analog signal to the operating parameter. In one embodiment, sensor interface 80 includes an analog-to-digital converter that converts an analog voltage signal generated by sensor 52 to a multi-bit digital signal usable by controller 42.

Controller 42 also includes a control interface 82 that is configured to control an operation of control device 78. In some embodiments, control interface 82 is operatively coupled to one or more wind turbine control devices 78, such as, for example pitch adjustment system 38 and power converter assembly 70.

Various connections are available between control interface 82 and control device 78 and between sensor interface 80 and sensor 52. Such connections may include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible outside wind turbine 10) network connection, whether wired or wireless.

Figure 3:
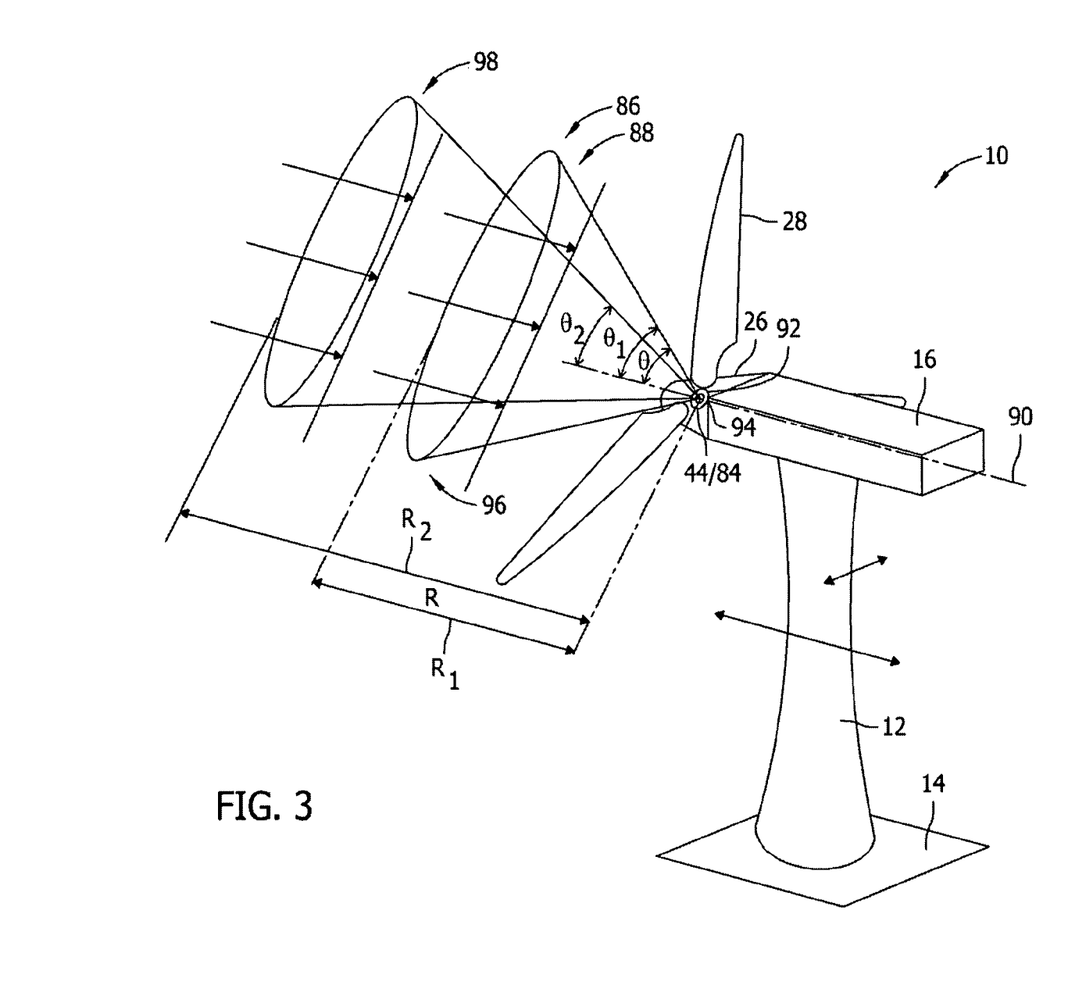
FIG. 3 is another perspective view of the wind turbine shown in FIG. 1.

FIG. 3 is another perspective view of wind turbine 10. Identical components shown in FIG. 3 are labeled with the same reference numbers used in FIG. 2. In the exemplary embodiment, each wind condition sensor 44 includes a light detection and ranging device, also referred to as LIDAR. LIDAR is a laser-based measurement device that is configured to scan an annular region around wind turbine 10 to measure wind conditions based upon a reflection and/or a scattering of light transmitted by the LIDAR from aerosol. Wind conditions are measured within a cone angle ($\theta$) and a range (R) that are selected based at least in part on a predefined level of accuracy of measurement as well as measurement sensitivity. In the exemplary embodiment, a LIDAR sensor 84 is mounted within hub 26 and/or an outer surface of hub 26, and is configured to measure wind conditions within a predefined portion 86 of a planar field of measurement 88 that is defined by cone angle ($\theta$) and range (R) upwind of wind turbine 10. Alternatively, LIDAR sensor 84 may be mounted within nacelle 16, and/or to an outer surface of nacelle 16. In the exemplary embodiment, cone angle ($\theta$) is measured from a centerline axis 90 defined by wind condition sensor 44. Range (R) is measured between wind condition sensor 44 and planar field of measurement 88. Portion 86 of measurement field 88 may be oriented with respect to predefined sections of rotor blade 28 such as, for example, sections near a tip end of each rotor blade 28 that contribute to an aerodynamic torque of rotor blade 28. Alternatively, wind condition sensor 44 may include a radio detection and ranging (RADAR) measuring device, a Doppler RADAR, a sonic detection and ranging (SODAR) measuring device, or any suitable measuring device that enables wind turbine 10 to function as described herein.

In the exemplary embodiment, control system 40 includes a first LIDAR sensor 92 and a second LIDAR sensor 94. First LIDAR sensor 92 and second LIDAR sensor 94 are each coupled to hub 26 and are configured to sense a wind condition such as, for example wind speed, a wind direction, a wind turbulence intensity, and/or a storm wind gust at a location upwind of wind turbine 10. In the exemplary embodiment, first LIDAR sensor 92 is configured to sense a wind condition at a first distance, i.e. a first range ($R_1$) and to transmit a signal indicative of the sensed wind condition at first range ($R_1$) to controller 42. Second LIDAR sensor 94 is configured to sense a wind condition at a second distance, i.e. a second range ($R_2$) that is greater than first range ($R_1$), and to transmit a signal indicative of the sensed wind condition at second range ($R_2$) to controller 42. Moreover, first LIDAR sensor 92 senses a wind condition that is closer to wind turbine 10 than the sensed wind condition from second LIDAR sensor 94 such that the sensed wind condition from first LIDAR sensor 92 more accurately reflects a wind condition at wind turbine 10. In addition, a planar field of measurement 88 of first LIDAR sensor 92 is closer to wind turbine 10 than a planar field of measurement 88 of second LIDAR sensor 94 such that first LIDAR sensor 92 includes an accuracy of measurement that is greater than an accuracy of measurement from second LIDAR sensor 94.

During operation of wind turbine 10, first LIDAR sensor 92 transmits a signal indicative of a wind condition in a first field 96 defined at first range ($R_1$). Controller 42 calculates a first wind turbine operating command based, at least in part, on the sensed wind condition within first field 96 to facilitate increasing a power output of wind turbine 10. In one embodiment, controller 42 calculates first wind turbine operating command to facilitate reducing a loading imparted to wind turbine components from wind forces. In the exemplary embodiment, second LIDAR sensor 94 transmits a signal indicative of a wind condition in a second field 98 defined at second range ($R_2$) that is farther upwind than first field 96. Controller 42 calculates a second wind turbine operating command based, at least in part, on the sensed wind condition within second field 98 to facilitate preventing an overspeed of wind turbine 10. In the exemplary embodiment, controller 42 calculates a collective wind turbine operating command based, at least in part, on the first wind turbine command and the second wind turbine command.

During low wind velocities, an increase in speed of the wind may cause an increase in the rotational speed of rotor 22 and rotor shaft 24, which in turn increases an electrical power output of generator 18. In some embodiments, the electrical power output of generator 18 is allowed to increase with the increased wind speed until a rated power output level is reached. As wind speed increases, controller 42 adjusts a pitch of rotor blade 28 such that a rotational speed of rotor shaft 24 and the electrical power output of generator 18 are maintained substantially constant at rated power output levels. In the exemplary embodiment, control system 40 is configured to maintain and/or increase a power output of generator 18 based on signals received from first LIDAR sensor 92. More specifically, controller 42 calculates the first wind turbine operating command based, at least in part, on the sensed wind condition from first LIDAR sensor 92 to adjust a power output of generator 18 to facilitate increasing a performance of wind turbine 10.

During a sudden gust of wind, wind speed may dramatically increase within a relatively small interval of time. During such sudden gusts, controller 42 adjusts a pitch of rotor blade 28 such that a rotational speed of rotor shaft 24 is reduced to facilitate preventing an overspeed of rotor shaft 24 which may increase loading on wind turbine 10 and cause damage to wind turbine components. In the exemplary embodiment, control system 40 is configured to protect wind turbine 10 based on signals received from second LIDAR sensor 94. More specifically, controller 42 calculates the second wind turbine operating command based, at least in part, on the sensed wind condition from second LIDAR sensor 94 to reduce a rotational speed of rotor shaft 24 to facilitate preventing an overspeed of wind turbine 10.

Figure 4:
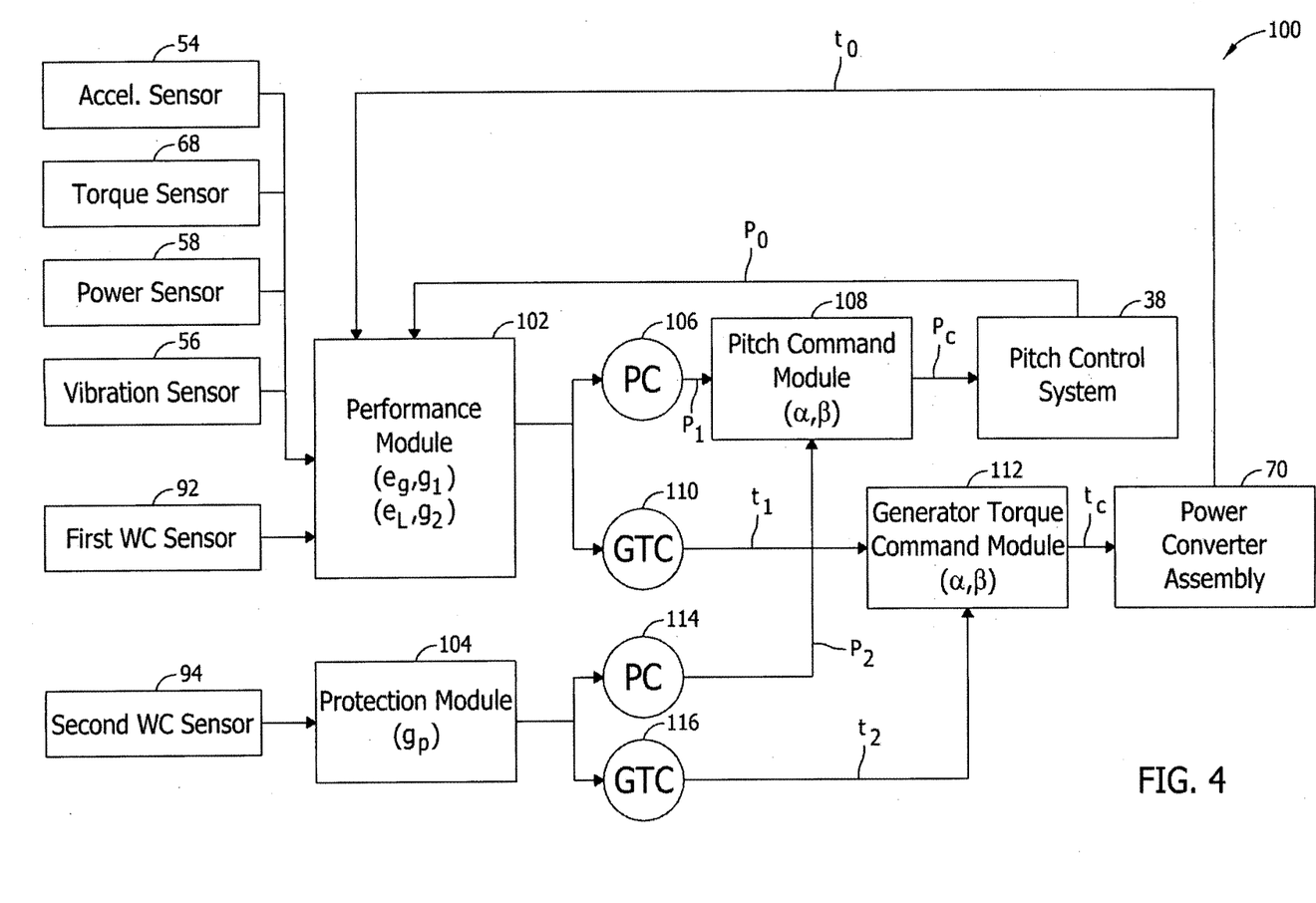
FIG. 4 is a schematic view of an exemplary load adjustment system that may be used with the wind turbine control system shown in FIG. 2.

FIG. 4 is a schematic view of an exemplary load adjustment system 100 that may be used with control system 40 to operate wind turbine 10. In the exemplary embodiment, load adjustment system 100 includes a performance module 102 and a protection module 104. Performance module 102 is configured to increase a performance of wind turbine 10 by operating wind turbine 10 to increase a power output of generator 18 and/or reduce a loading of wind turbine components. Protection module 104 is configured to operate wind turbine 10 to reduce a rotational speed of rotor shaft 24 to facilitate preventing an overspeed of wind turbine 10.

Performance module 102 is configured to utilize a sensed wind condition within first field 96 from first LIDAR sensor 92 to generate a wind turbine operating command that is configured to increase a power output of generator 18 and/or reduce a loading to wind turbine components. In the exemplary embodiment, performance module 102 receives signals from acceleration sensor 54, vibration sensor 56, power sensor 58, and/or torque sensor 68, and calculates a generator speed based, at least in part, on the received signals. In addition, performance module 102 receives signals indicative of an operating pitch command ($p_O$) from pitch adjustment system 38, and receives a signal indicative of an operating generator torque command ($t_O$) from power converter assembly 70. Performance module 102 also receives a signal indicative of a wind condition at first range ($R_1$) upwind of wind turbine 10 from first LIDAR sensor 92, and calculates a generator speed based, at least in part, on the sensed wind condition.

In the exemplary embodiment, performance module 102 determines a generator speed error ($e_g$) between a predefined generator speed and the calculated generator speed, and calculates a generator adjustment ($g_1$) to generate a wind turbine operating command indicative of a required change in blade pitch angle and/or air gap torque to reduce the error ($e_g$) between the predefined generator speed and the calculated generator speed. Alternatively, performance module 102 calculates a component loading based on the sensed wind condition and determines a loading error ($e_L$) between a predefined component loading and the calculated component loading. Performance module 102 calculates a loading adjustment ($g_2$) to generate a wind turbine operating command indicative of a required change in blade pitch angle and/or air gap torque to reduce error ($e_L$).

In the exemplary embodiment, a first pitch command generator 106 calculates a first pitch command ($p_1$) based on the calculated generator adjustment ($g_1$), and transmits a signal indicative of the first pitch command ($p_1$) to a pitch command module 108. Similarly, a first generator torque command generator 110 generates a first torque command ($t_1$) based on the calculated generator adjustment ($g_1$), and transmits a signal indicative of the first generator torque command ($t_1$) to a generator torque command module 112.

In the exemplary embodiment, protection module 104 is configured to utilize a sensed wind condition within second field 98 from second LIDAR sensor 94 to generate a wind turbine operating command that is configured to reduce a rotational speed of rotor shaft 24 and/or generator 18 to facilitate preventing an overspeed of wind turbine 10. Protection module 104 receives a signal indicative of a wind condition at second range ($R_2$) upwind of wind turbine 10 from second LIDAR sensor 94, and calculates a rotor shaft speed and/or a generator speed based, at least in part, on the sensed wind condition. Protection module 104 calculates a protection adjustment ($g_P$) to generate a wind turbine operating command indicative of a required change in blade pitch angle and/or air gap torque to reduce a rotational speed of rotor shaft 24 and/or reduce a rotational speed of generator 18 in advance of a sudden change in wind speed. A second pitch command generator 114 calculates a second pitch command ($p_2$) based on the calculated protection adjustment ($g_P$), and transmits a signal indicative of the second pitch command ($p_2$) to pitch command module 108. A second generator torque command generator 116 generates a second torque command ($t_2$) based on the calculated protection adjustment ($g_P$), and transmits a signal indicative of the second generator torque command ($t_2$) to generator torque command module 112.

In the exemplary embodiment, first pitch command ($p_1$) and second pitch command ($p_2$) are summed at pitch command module 108 to generate a collective pitch command ($p_C$). Pitch command module 108 transmits collective pitch command ($p_C$) to pitch adjustment system 38 to adjust a pitch of rotor blade 28 based on collective pitch command ($p_C$). In one embodiment, pitch command module 108 applies one or more weighting factors ($\alpha$, $\beta$, and n-factor) to each first pitch command ($p_1$) and second pitch command ($p_2$) to generate collective pitch command ($p_C$). Generator torque command module 112 calculates a collective generator torque command ($t_C$) based on a sum of first torque command ($t_1$) and second torque command ($t_2$), and transmits collective generator torque command ($t_C$) to power converter assembly 70 to adjust an air gap torque of generator 18 based on collective generator torque command ($t_C$). In one embodiment, generator torque command module 112 applies one or more weighting factors ($\alpha$, $\beta$, and n-factor) to first torque command ($t_1$) and to second torque command ($t_2$) to generate collective generator torque command ($t_C$).

During operation of wind turbine 10, controller 42 receives from first LIDAR sensor 92 signals that are indicative of a first wind condition at first range ($R_1$) and receives from second LIDAR sensor 94 signals that are indicative of a second wind condition at second range ($R_2$) that is farther from wind turbine 10 than first range ($R_1$). Controller 42 is configured to calculate a wind turbine operating command based at least in part on the sensed first wind condition and the sensed second wind condition. Controller 42 is also configured to calculate a blade pitch command based, at least in part, on the sensed first wind condition and the sensed second wind condition, and to operate pitch adjustment system 38 to adjust the pitch of rotor blade 28 based on the calculated blade pitch command.

In one embodiment, controller 42 is configured to calculate a first blade pitch command signal based, at least in part, on the sensed first wind condition to facilitate increasing a performance of wind turbine 10. Controller 42 is also configured to calculate a second blade pitch command signal based, at least in part, on the sensed second wind condition to facilitate preventing an overspeed of wind turbine 10. In this embodiment, controller 42 is configured to calculate a collective blade pitch command based, at least in part, on the calculated first blade pitch command and the calculated second blade pitch command, and to operate pitch adjustment system 38 to adjust the pitch of rotor blade 28 based on the calculated collective blade pitch command. In an alternative embodiment, controller 42 calculates the second blade wind turbine operating command signal when the sensed second wind condition is different than a predetermined wind condition.

In the exemplary embodiment controller 42 is configured to generate a pitch command signal for each rotor blade 28. In one embodiment, controller 42 is configured to generate the same pitch command signal for each rotor blade 28. Alternatively, controller 42 is configured to generate a different pitch command signal for each rotor blade 28. In the exemplary embodiment, control system 40 is configured to adjust a pitch of each rotor blade 28 at the same time period and to adjust a pitch of each rotor blade 28 at a different time period.

In the exemplary embodiment, controller 42 is configured to calculate a generator torque command based at least in part on the sensed first wind condition and the sensed second wind condition. Controller 42 is also configured to operate generator 18 to adjust an air-gap toque of generator 18 based on the calculated generator torque command. In one embodiment, controller 42 is configured to calculate a first generator torque command signal based at least in part on the sensed first wind condition, and to calculate a second generator torque command signal based at least in part on the sensed second wind condition. In this embodiment, controller 42 is also configured to calculate a collective generator torque command based at least in part on the calculated first blade pitch command and the calculated second blade pitch command, and to operate generator 18 to adjust an air-gap toque of generator 18 based on the calculated collective generator torque command.

Figure 5:
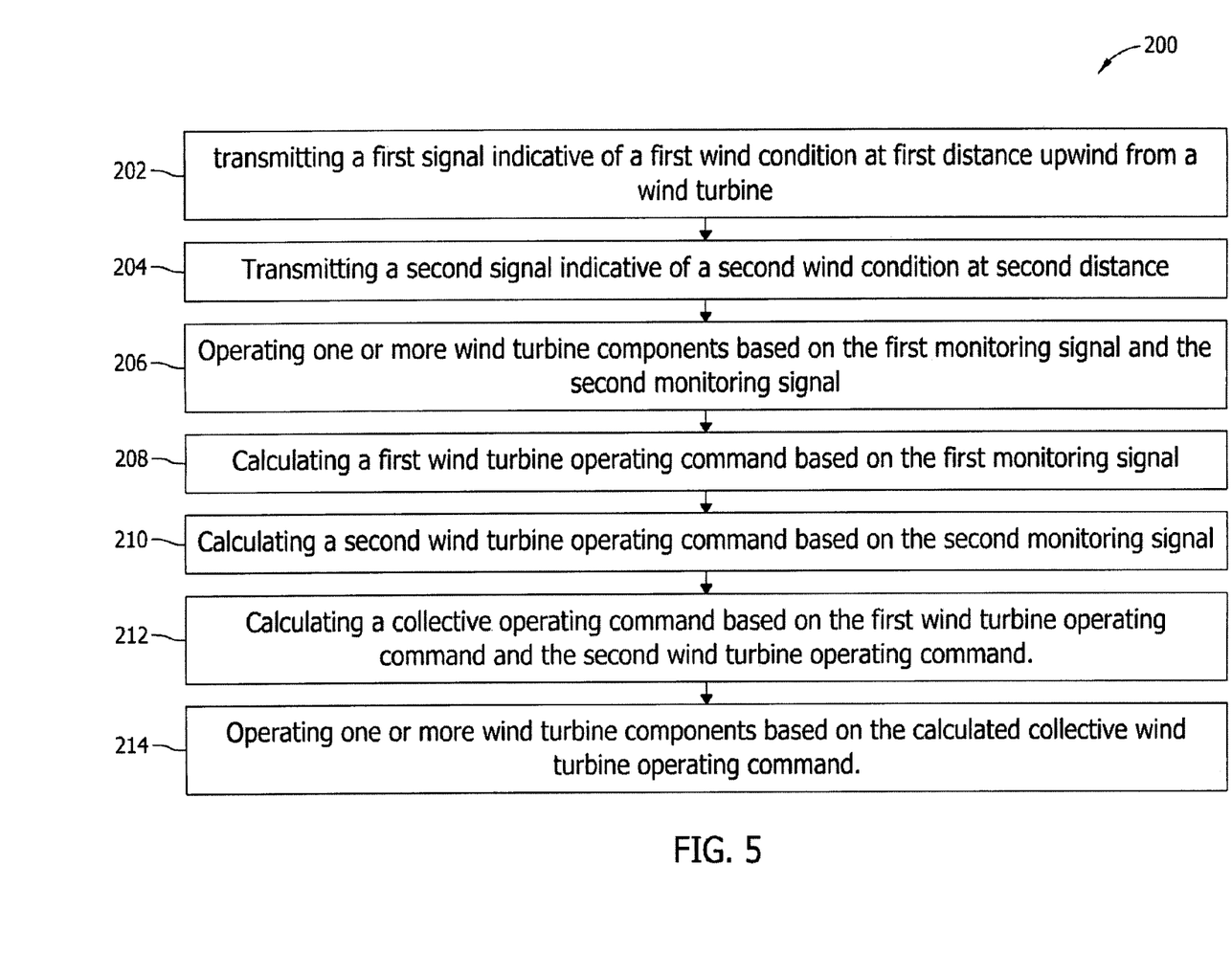
FIG. 5 is a flow chart illustrating an exemplary method that may be used for operating the wind turbine shown in FIG. 1.

FIG. 5 is a flow chart illustrating an exemplary method 200 of operating wind turbine 10. In the exemplary embodiment, method 200 includes transmitting 202, from first LIDAR sensor 92 to controller 42, at least a first monitoring signal indicative of a first wind condition at first range ($R_1$) upwind from wind turbine 10. At least a second monitoring signal indicative of a second wind condition at second range ($R_2$) is transmitted 204, by second LIDAR sensor to controller 42. Controller 42 operates 206 one or more wind turbine components based on the first monitoring signal and the second monitoring signal. In one embodiment, controller 42 calculates 208 a first wind turbine operating command based, at least in part, on the first monitoring signal to facilitate increasing a performance of the wind turbine 10, and calculates 210 a second wind turbine operating command based, at least in part, on the second monitoring signal to facilitate preventing an overspeed of wind turbine 10. Controller 42 also calculates 212 a collective operating command based, at least in part, on the calculated first wind turbine operating command and the calculated second wind turbine operating command. Controller 42 also operates 214 one or more wind turbine components based on the calculated collective wind turbine operating command.

In an alternative embodiment, controller 42 calculates a first blade pitch command signal based, at least in part, on the sensed first wind condition, and calculates a second blade pitch command signal based, at least in part, on the sensed second wind condition. Controller 42 calculates a collective blade pitch command based, at least in part, on the calculated first blade pitch command and the calculated second blade pitch command, and operates pitch adjustment system 38 to adjust a pitch of rotor blade 28 based on the calculated collective blade pitch command.

In another alternative embodiment, controller 42 calculates a first generator torque command signal based on the sensed first wind condition, and calculates a second generator torque command signal based on the sensed second wind condition. Controller 42 also calculates a collective generator torque command based on the calculated first generator torque command and the calculated second generator torque command, and operates generator 18 to adjust an air gap torque based on the calculated collective generator torque command.

An exemplary technical effect of the method, system, and apparatus described herein includes at least one of: (a) transmitting, from a first sensor to a control system, at least a first monitoring signal indicative of a first wind condition at a first distance from the wind turbine in the direction of the wind; (b) transmitting, from a second sensor to the control system, at least a second monitoring signal indicative of a second wind condition at a second distance from the wind turbine in the direction of the wind that is larger than the first distance; (c) calculating, by the control system, a wind turbine operating command based at least in part on the first monitoring signal and the second monitoring signal; and (d) operating one or more wind turbine components based on the calculated wind turbine operating command.

The above-described method, system, and apparatus facilitate adjusting a pitch of a rotor blade based on a sensed wind condition upwind of the wind turbine. Moreover, the embodiments described herein facilitate calculating a pitch adjustment based, at least in part, on a sensed wind condition at two locations upwind of the wind turbine to prevent an overspeed of the wind turbine. By calculating the pitch angle based on the sensed wind condition upwind of the wind turbine, the above-described method, system, and apparatus overcome the problem of known wind turbines that rely on wind speed that are adversely affected by the rotation of the rotor. As such, the embodiments described herein facilitate improving the operation of the wind turbine to increase the annual energy production of the wind turbine.

Exemplary embodiments of a method, system, and apparatus for controlling a wind turbine are described above in detail. The systems and methods are not limited to the specific embodiments described herein, but rather, components of the system and/or steps of the methods may be utilized independently and separately from other components and/or steps described herein. For example, the methods may also be used in combination with other rotating systems, and are not limited to practice with only the wind turbine system as described herein. Rather, the exemplary embodiment can be implemented and utilized in connection with many other rotating system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of operating a wind turbine, the wind turbine including a rotor rotatably coupled to a generator positioned within a nacelle, the rotor including one or more rotor blades coupled to a hub, said method comprising:
   transmitting, from a first sensor to a control system, at least a first monitoring signal indicative of a first wind condition at a first distance from the wind turbine;
   calculating a first generator torque command based on the first monitoring signal;
   transmitting, from a second sensor to the control system, at least a second monitoring signal indicative of a second wind condition at a second distance from the wind turbine that is longer than the first distance;
   calculating a second generator torque command based on the second monitoring signal;
   calculating, by the control system, a collective generator torque command based on the first generator torque command and the second generator torque command; and,
   operating one or more wind turbine components based on the calculated collective generator torque command.

2. A method in accordance with claim 1, further comprising:
   calculating a first wind turbine operating command based at least in part on the first monitoring signal to facilitate increasing a performance of the wind turbine;
   calculating a second wind turbine operating command based at least in part on the second monitoring signal to facilitate reducing an overspeed of the wind turbine; and,
   calculating the collective wind turbine operating command based at least in part on the calculated first wind turbine operating command and the calculated second wind turbine operating command.

3. A method in accordance with claim 2, further comprising calculating the second wind turbine operating command signal when the second wind condition is different than a predefined wind condition.

4. A method in accordance with claim 1, further comprising sensing a first wind condition and a second wind condition with one or more light detection and ranging (LIDAR) devices.

5. A method in accordance with claim 1, wherein the wind condition includes one of a wind speed, a wind direction, a wind turbulence intensity, and a wind gust.

6. A method in accordance with claim 1, wherein the wind turbine includes a pitch control system coupled to at least one rotor blade, said method further comprises:
   calculating a first blade pitch command based at least in part on the first monitoring signal;
   calculating a second blade pitch command based at least in part on the second monitoring signal;
   calculating a collective blade pitch command based at least in part on the calculated first blade pitch command and the calculated second blade pitch command; and,
   operating the pitch control system to adjust the pitch of the rotor blade based on the calculated collective blade pitch command.

7. A method in accordance with claim 1, further comprising
   operating the generator to adjust an air-gap torque of the generator based on the calculated collective generator torque command.

8. A wind turbine control system for use with a wind turbine, the wind turbine including a rotor rotatably coupled to a generator positioned within a nacelle, the rotor including one or more rotor blades coupled to a hub, said wind turbine control system comprising:

a first sensor configured to sense a first wind condition at a first distance from the wind turbine;
a second sensor configured to sense a second wind condition at a second distance from the wind turbine that is longer than the first distance; and,
a controller coupled to said first sensor and said second sensor, said controller configured to:
calculate a first generator torque command based on the sensed first wind condition;
calculate a second generator torque command based on the sensed second wind condition; and,
calculate a collective generator torque command based on the first generator torque command and the second generator torque command; and,
operate one or more wind turbine components based on the calculated collective generator torque command.

9. A wind turbine control system in accordance with claim 8, wherein said wind turbine includes a pitch control system coupled to at least one rotor blade, said controller coupled to said pitch control system and configured to:
calculate a blade pitch command based at least in part on the sensed first wind condition and the sensed second wind condition; and,
adjust the pitch of the rotor blade based on the calculated blade pitch command.

10. A wind turbine control system in accordance with claim 9, wherein said controller is further configured to:
calculate a first blade pitch command based at least in part on the sensed first wind condition;
calculate a second blade pitch command based at least in part on the sensed second wind condition; and,
calculate a collective blade pitch command based at least in part on the calculated first blade pitch command and the calculated second blade pitch command.

11. A wind turbine control system in accordance with claim 8, wherein said controller is coupled to the generator and is configured to
adjust an air-gap torque of the generator based on the calculated generator torque command.

12. A wind turbine control system in accordance with claim 8, wherein each of said first sensor and said second sensor comprises at least one of light detection and ranging (LIDAR) device, a radio detention and ranging (RADAR) device, and a sonic detection and ranging (SODAR) device.

13. A wind turbine control system in accordance with claim 8, wherein the wind condition includes at least one of a wind speed, a wind direction, a wind turbulence intensity, and a wind gust.

14. A wind turbine system, comprising:
a tower;
a nacelle coupled to said tower;
a generator positioned within said nacelle;
a rotor coupled to said generator with a rotor shaft;
at least one rotor blade coupled to said rotor; and,
a wind turbine control system comprising:
a first sensor configured to sense a first wind condition at a first distance from the wind turbine;
a second sensor configured to sense a second wind condition at a second distance from the wind turbine that is longer than the first distance; and,
a controller coupled to said first sensor and said second sensor, said controller configured to:
calculate a first generator torque command based on the sensed first wind Condition;
calculate a second generator torque command based on the sensed second wind condition; and,
calculate a collective generator torque command based on the first generator torque command and the second generator torque command; and,
operate one or more wind turbine components based on the calculated collective generator torque command.

15. A wind turbine system in accordance with claim 14, wherein each of said first sensor and said second sensor comprises at least one of a LIDAR device, a RADAR device, and a SODAR device.

16. A wind turbine system in accordance with claim 14, further comprising a pitch control system coupled to said at least one rotor blade, said controller coupled to said pitch control system and configured to:
calculate a blade pitch command based at least in part on the sensed first wind condition and the sensed second wind condition; and,
adjust the pitch of the rotor blade based on the calculated blade pitch command.

17. A wind turbine system in accordance with claim 16, wherein said controller is further configured to:
calculate a first blade pitch command based at least in part on the sensed first wind condition;
calculate a second blade pitch command based at least in part on the sensed second wind condition; and,
calculate a collective blade pitch command based at least in part on the calculated first blade pitch command and the calculated second blade pitch command.

18. A wind turbine system in accordance with claim 14, wherein said controller is coupled to said generator and is configured to
adjust an air-gap torque of the generator based on the calculated generator torque command.

* * * * *